United States Patent [19]
Smith et al.

[11] Patent Number: 4,879,317
[45] Date of Patent: Nov. 7, 1989

[54] METHOD FOR REDUCING SILICONE FOAM DENSITY AND SILICONE FOAM COMPOSITIONS

[75] Inventors: Kennith A. Smith, Clifton Park, N.Y.; Connie L. Haig, Evansville, Ind.

[73] Assignee: General Electric Company, Schenectady, N.Y.

[21] Appl. No.: 302,105

[22] Filed: Jan. 24, 1989

Related U.S. Application Data

[63] Continuation of Ser. No. 235,135, Aug. 23, 1988, abandoned.

[51] Int. Cl.$^4$ ................................................ C08J 9/02
[52] U.S. Cl. ............................................ 521/82; 521/77; 521/88; 521/91; 521/117; 521/124; 521/134; 521/154; 525/15; 525/31; 525/32
[58] Field of Search ................. 521/82, 88, 77, 91, 521/117, 124, 134; 528/15, 31, 32

[56] References Cited

U.S. PATENT DOCUMENTS

| | | | |
|---|---|---|---|
| 3,428,580 | 2/1969 | Nitzsche et al. | 521/154 |
| 4,590,222 | 5/1986 | Bauman | 521/154 |
| 4,593,049 | 6/1986 | Bauman | 521/154 |
| 4,695,597 | 9/1987 | Seino | 521/154 |
| 4,762,859 | 8/1988 | Modic | 521/154 |
| 4,767,794 | 8/1988 | Modic | 521/154 |

*Primary Examiner*—Morton Foelak
*Attorney, Agent, or Firm*—William A. Teoli; James C. Davis, Jr.; William H. Pittman

[57] ABSTRACT

A method is provided for reducing the density of silicone foam resulting from the generation of hydrogen gas by employing a hydride polysiloxane in the form of a mixture of linear hydride polysiloxane and cyclic hydride polysiloxane. Aqueous methanol is also found to be an effective density-reducing agent.

6 Claims, No Drawings

METHOD FOR REDUCING SILICONE FOAM DENSITY AND SILICONE FOAM COMPOSITIONS

This application is a continuation of application Ser. No. 235,135, filed Aug. 23, 1988 now abandoned.

BACKGROUND OF THE INVENTION

The present invention relates to a method of making silicone foam having reduced density and to silicone foam compositions used in such method. More particularly, the present invention relates to the use of a hydride polysiloxane in the form of a mixture of a linear hydride polysiloxane and a cyclic hydride polysiloxane to effect a significant reduction in foam density of silicone foam resulting from the platinum catalyzed reaction between a vinyl-terminated polydiorganosiloxane, a hydride polysiloxane, and a hydroxylated material, which are defined more particularly hereinafter.

Elastomeric silicone foams have been used in a variety of applications such as thermo- and electrical insulators, foam barriers, and cushions. Even though elastomeric silicone foams are superior to organic foams in many instances, organic foams are often used based on economic consideration.

At the present time, commercially available silicone foam has a foam density which can provide a 15-25 pound/cubic ft. foam structure. One method of reducing the cost of elastomeric silicone foam, is to reduce foam density without altering the desirable physical properties of the foam material.

Although silicone foam may be made by using a blowing agent, or even mechanical mixing, another technique is by effecting the generation of hydrogen gas using a platinum catalyst as shown by Smith, U.S. Pat. No. 3,923,705. Elastomeric silicone foams can be made by forming a mixture of a silanol, a silicone hydride, and a vinyl-containing silicone in the presence of a platinum catalyst. There is effected the simultaneous generation of hydrogen gas along with cross-linking. For example, Modic, U.S. Pat. No. 4,189,545 produces silicone foam by adding water to a composition of a vinyl-containing siloxane, a hydride-containing siloxane and platinum to generate hydrogen simultaneously with cross-linking. Modic, U.S. Pat. No. 4,418,157 shows the strengthening of silicone foam by adding a resinous copolymer, while Bauman et al., U.S. Pat. No. 4,599,367 reduces silicone foam density by using a combination of silanol and water.

The present invention is based on the discovery that a substantial reduction in silicone foam density can be achieved by using a hydride polysiloxane in a silicone foamable mixture comprising a vinyl-terminated polydiorganosiloxane, a hydride polysiloxane, a hydroxylated material and an effective amount of a platinum catalyst, where the hydride polysiloxane in such silicone foamable mixture consists essentially of a mixture of a linear hydride polysiloxane, and a cyclic hydride polysiloxane. A further reduction in silicone foam density can be achieved by using an aqueous mixture of a $C_{(1-8)}$ alkanol, such as a mixture of water and methanol.

STATEMENT OF THE INVENTION

There is provided by the present invention a foamable composition comprising by weight, (A) 100 parts of a vinyl-terminated polydiorganosiloxane, (B) 0.5–50 parts of a hydride polysiloxane consisting essentially of a mixture of 20% to 85% by weight of a substantially linear hydride polysiloxane and 15% to 80% by weight of cyclic hydride polysiloxane, (C) 0.2–10 parts of a hydroxylated material consisting essentially of a mixture of 0% to 40% by weight of a $C_{(1-8)}$ alkanol and 60% to 100% by weight of water, and (D) an effective amount of a platinum catalyst.

There can be used as the vinyl-terminated polydiorganosiloxane, polydiorganosiloxane fluids having a viscosity from about 100 to about 1,000,000 centipoise at 25° C., and preferably from about 2500 to 500,000 centipoise. The vinyl-substitution in the vinyl-terminated polydiorganosiloxane can range of from about 0.0002 to 3% by weight, and preferably from about 0.001 to about 1% by weight of vinylterminated polydiorganosiloxane. The vinyl-terminated polydiorganosiloxane is preferably terminated with vinyldiorganosiloxy units, and the organo radicals of the vinylterminated polydiorganosiloxane are selected from $C_{(1-20)}$ monovalent hydrocarbon radicals or $C_{(1-20)}$ monovalent hydrocarbon radicals substituted with radicals inert during equilibration.

There are included by the organo radicals of the vinyl-terminated polydiorganosiloxane alkyl radicals such as methyl, ethyl, propyl, etc.; cycloalkyl radicals, such as cyclohexyl, cycloheptyl, etc.; haloalkyl radicals such as trifluoropropyl; aryl radicals, for example, phenyl, tolyl, xylyl, naphthyl; haloaryl radicals such as chlorophenyl, nitrotolyl, nitrophenyl, etc.; alkenyl radicals such as vinyl, allyl. It is preferred that the organo radicals are selected from methyl, phenyl, vinyl, and 3,3,3-trifluoropropyl.

The vinyl-terminated polydiorganosiloxanes are well-known in the art and can be made, for example, by equilibrating cyclic polydiorganosiloxanes with or without vinyl substitution in the presence of appropriate amount of a vinyl chain-stopper such as a 1,3-divinyl tetraorganodisiloxane. Further details for making vinyl-substituted polydiorganosiloxanes can be found in Modic, U.S. Pat. No. 3,425,967 incorporated herein by reference.

The hydride polysiloxane which can be used in the practice of the present invention consists essentially of a mixture of a linear hydride polysiloxane having the formula,

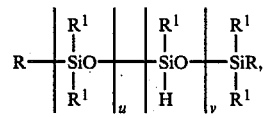

and a cyclic hydride polysiloxane having the formula,

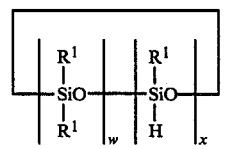

where R is a member selected from the class consisting of hydrogen, $C_{(1-8)}$ alkyl radicals, $C_{(1-8)}$ halo substituted alkyl radicals, $C_{(6-14)}$ aryl radicals, and halo substituted $C_{(6-14)}$ aryl radicals, $R^1$ is a member selected from the class consisting of $C_{(1-8)}$ alkyl radicals, $C_{(6-14)}$ aryl radicals, $C_{(6-14)}$ halo aryl radicals and $C_{(3-8)}$ fluoroalkyl radicals, u and v are integers which can vary sufficiently to provide a hydride polysiloxane having a viscosity of from about 5 to about 10,000 centipoise at 25° C., w is an integer having a value of 0 to 5 inclusive, x is an integer having a value of from 1 to 8 inclusive and the sum of w and x has a value of from 3 to 8 inclusive. Preferably, the hydride polysiloxane consists essentially of chemically combined organosiloxy units having silicon bonded hydrogen atoms attached to silicon to form the polysiloxane chain backbone. Preferably the cyclic hydride polysiloxane is a mixture of cyclic hydride polysiloxane within the above formula.

In addition to the hydride polysiloxane and cyclic hydride polysiloxane, the silicone foam composition of the present invention require a source of hydroxy radicals in the form of a hydroxylated material. The hydroxylated material which has been found to be effective is an aqueous mixture of a $C_{(1-8)}$ alkanol such as methanol, ethanol, propanol, butanol, pentanol. Preferably, an aqueous mixture of methanol and water has been found to provide optimum results. In addition to an aqueous alkanol mixture, hydroxylated silicones such as silanols in the form of homopolymers, copolymers, and mixture thereof, also can be used.

Platinum catalysts which can be used in the practice of the present invention in making the silicone foam compositions are, for example, reaction products of an olefin and chloro platinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes and mixtures thereof, as shown in Lamoreaux, U.S. Pat. No. 3,220,972. The preferred platinum catalyst is shown by Karstedt, U.S. Pat. No. 3,775,452, which is formed by reacting chloroplatinic acid with tetramethyldivinyldisiloxane in the presence of sodium bicarbonate in an ethanol solution. It has been found that effective results can be achieved if sufficient platinum catalyst is employed in the silicone foamable composition to provide from 1 to 250 parts per million of platinum, preferably from 1 to 200 parts of platinum per million parts of mixture.

In addition to the aforementioned basic ingredients, the silicone foam composition can contain from 1 to 200 parts by weight of a filler, per hundred parts of foam composition. It is preferred to use extending fillers or reinforcing fillers such as fumed silica, precipitated silica also can be used in instances where it is desired to increase the physical properties such as the tensile strength and tear strength of the resultin elastomeric silicone foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, α-quartz, clay, carbon, and graphite. In order to minimize the viscosity increase generally experienced when using reinforcing fillers, the reinforcing fillers can be heat treated with cyclic polysiloxanes or silazanes. A preferred filler in the practice of the present invention is ground quartz which has been found to enhance the burn-resistant properties of the composition as well as imparting some enhanced physical properties to the final cured silicone foam.

The silicone foam compositions of the present invention are generally used and stored as a two-part composition. The platinum catalyst is preferably incorporated in the vinyl-containing polysiloxane. Hydroxylated material also can be added to the vinyl-containing polysiloxane along with the filler.

In forming the silicone foam, the hydride polysiloxane (Part B) is rapidly mixed with the vinyl-containing siloxane (Part A) containing the hydroxylated material and platinum catalyst. The resulting composition can be poured into a cavity and allowed to stand. The composition thereafter will begin to cross-link and generate gas simultaneously resulting in a cured elastomeric silicone foam having a density of less than 20 pounds per cubic foot.

If desired, an inhibitor, such as diallylmaleate or methylethylketone peroxide, or dimethylacetylenedicarboxylate, can be added to the compositions at a concentration of anywhere from 100 parts to 10,000 parts, per million parts based on ttal composition to increase the worklife of the curable silicone mixture.

In addition to the aforementioned silica fillers, there also can be used additional additives such as carbon black, pigment, glass fibers, etc. In addition, additives such as MQ or MQD resins can be added to lower density, increase strength as described in U.S. Pat. No. 4,418,157, incorporated herein by reference.

In order that those skilled in the art will be better able to practice the present invention, the following examples are given by way of illustration and not by way of limitation. All parts are by weight.

EXAMPLE 1

A mixture of 20 grams of a blend containing 39% by weight of a polydimethylsiloxane having terminal dimethylvinylsiloxy units and a viscosity of about 75,000 centistokes, 15% by weight of a polydimethylsiloxane having terminal dimethylvinylsiloxy units and a viscosity of 4000 centistokes, 18% by weight of a methylsiloxane resin consisting essentially of chemically combined $SiO_2$ in a ratio of 1.43 moles of trimethylsiloxy units, per 0.25 mole of methlvinylsiloxy units, 25% by weight of α-quartz, 2% by weight of calcium carbonate, 1.5% by weight of water, and 20 to 50 parts per million of platinum in the form of a platinum vinyl siloxane complex were blended for three minutes using a stainless steel spatula.

There was then added to the above platinum containing silicone blend, 2.0 grams of a hydride polysiloxane in the form of a linear hydride polysiloxane (PMHS) having terminal trimethylsiloxy units and consisting essentially of methyl hydrogen siloxy units having a viscosity of about 3000–5000 centistokes or a mixture of such linear hydride polysiloxane and a cyclic methylhydrogen tetrasiloxane ($D_4$—H). The hydride polysiloxane consisted essentially of a mixture of 0.5–2 grams of the linear hydride polysiloxane and from 0–1.5 grams of cyclic methylhydrogen tetrasiloxane. In certain cases, 0.2 gram of methanol were added to the platinum containing silicone mixture.

The hydride polysiloxane mixture was mixed with the platinum containing silicone mixture for 30 seconds and then transferred to a pre-weighed container. Foaming occurred in the resulting mixed blend and gel times were determined by observing when the foam remaining in the container had jelled sufficiently to snap back when stretched out with a spatula.

The following results were obtained, where CS is the average cell size, and GT is the gel time.

TABLE I

| Additions (grams) | Hydride polysiloxane (grams) | GT (min) | Density (lb/cu-ft) | CS (mm) |
|---|---|---|---|---|
| — | PMHS(1.0) | 4 | 19.2 | — |
| — | PMHS(2.0) | 3 | 13.8 | 0.45 |
| — | D$_4$-H(2.0) | — | — | — |
| — | PMHS/D$_4$-H (1.5/0.5) | 3 | 12.5 | 0.47 |
| — | PMHS/D$_4$-H (0.5/1.5) | >30 | 10.1 | — |
| CH$_3$OH(0.2) | PMHS/D$_4$-H (0.5/1.5) | >30 | 7.5 | — |
| CH$_3$OH(0.2) | PMHS(2.0) | 3.5 | 11.8 | 0.71 |
| CH$_3$OH(0.2) | PMHS/D$_4$-H (1.5/0.5) | 2.5 | 9.6 ± 0.4 | 0.89 |
| CH$_3$OH(0.2) | PMHS/D$_4$-H (1.25/0.75) | 3.5 | 9.8 | 0.95 |

It was also found that the cyclic hydride polysiloxane alone did not foam after a 24 hour period.

The above results show that the optimum reduction in foam density is achieved with a mixture of hydride polysiloxane consisting essentially of a blend of the linear hydride polysiloxane and the cyclic hydride polysiloxane.

Improved results were also achieved with the blend of the platinum containing silicone and the hydride polysiloxane in the form of a mixture of linear hydride polysiloxane and cyclic hydride polysiloxane in the presence of methanol. In instances where the hydride polysiloxane was used in combination with methanol and in the absence of cyclic hydride polysiloxane, larger gel times were required, even though the foam density and cell size were satisfactory.

EXAMPLE 2

The procedure of Example 1 was repeated, except that the platinum catalyst in the form of a platinum methylvinylcyclotetrasiloxane was used in particular instances. In instances where the platinum methylvinylcyclotetrasiloxane catalyst was used, the silicone composition of Example 1 was used, except that water and the platinum catalyst were added to the other ingredients prior to the addition of the hydride polysiloxane. In both Example 1 and the present example, there was used 0.3 grams of water, either with methanol or without methanol. The following results were obtained where "Karstedt" is the platinum vinyldisiloxane complex, "Ashby" is the platinum methylvinylcyclotetrasiloxane complex and PMHS and D$_4$—H are as defined in Example 1.

TABLE II

| Catalyst (ppm) | CH$_3$OH (grams) | Silane (grams) | GT (min) | Density (lb/cu-ft) |
|---|---|---|---|---|
| Karstedt's (20) | 0.2 | PMHS/D$_4$-H (1.5)(0.5) | 8 | 8.4 |
| Karstedt's (40) | 0.2 | PMHS/D$_4$-H (1.5)(0.5) | 2 | 10.8 |
| Ashby's (40) | 0.2 | PMHS/D$_4$-H (1.5)(0.5) | 4 | 11.2 |
| Ashby's (40) | 0 | PMHS/D$_4$-H (1.5)(0.5) | 1.5 | 14.1 |

The above results show that optimum density reduction is achieved in instances where the hydride polysiloxane is in the form of a mixture of linear hydride polysiloxane and cyclohydridepolysiloxane. The advantages of methanol use is also demonstrated.

Although the above examples are directed to only a few of the very many variables which can be used in the practice of the present invention, it should be understood that the present invention is directed to a much broader variety of vinyl terminated polydiorganosiloxane, hydridepolysiloxane, hydroxylated material and platinum catalysts as set forth in the description preceding these examples.

What is claimed and sought to be protected by Letters Patent of the United States is as follows:

1. A foamable composition comprising by weight,
  (A) 100 parts of a vinyl-terminated polydiorganosiloxane,
  (B) 0.5-50 parts of a hydride polysiloxane consisting essentially of a mixture of 20% to 85% by weight of a substantially linear hydride polysiloxane and 15% to 80% by weight of cyclic hydride polysiloxane,
  (C) 0.2-10 parts of a hydroxylated material consisting essentially of a mixture of 0% to 40% by weight of a C$_{(1-8)}$ alkanol and 60% to 100% by weight of water, and
  (D) an effective amount of a platinum catalyst.

2. A foamable composition in accordance with claim 1, where the vinyl terminated polydiorganosiloxane is a vinyl terminated polydimethylsiloxane.

3. A foamable composition in accordance with claim 1, where the hydroxylated material is a mixture of methanol and water.

4. A foamable composition in accordance with claim 1, where the platinum catalyst is a platinum vinyldisiloxane.

5. A foamable composition in accordance with claim 1, where the cyclic hydride polysiloxane is a hydride cyclotetrasiloxane.

6. A method for making silicone foam having a reduced foam density comprising agitating a mixture of ingredients comprising, by weight,
  (A) 100 parts of a vinyl-terminated polydiorganosiloxane,
  (B) 0.5-50 parts of a hydride polysiloxane consisting essentially of a mixture of 20% to 85% by weight of a substantially linear hydride polysiloxane and 15% to 80% by weight of cyclic hydride polysiloxane,
  (C) 0.2-10 parts of a hydroxylated material consisting essentially of a mixture of 0% to 40% by weight of a C$_{(1-8)}$ alkanol and 60% to 100% by weight of water, and
  (D) an effective amount of a platinum catalyst.

* * * * *